United States Patent
Leconte et al.

(10) Patent No.: US 9,747,453 B2
(45) Date of Patent: Aug. 29, 2017

(54) TESTING INTEGRATED INDEPENDENT LEVELS OF SECURITY COMPONENTS HOSTED ON A VIRTUALIZATION PLATFORM

(71) Applicants: Airbus Operations (SAS), Toulouse (FR); Airbus Defence and Space GmbH, Ottobrunn (DE)

(72) Inventors: Bertrand Leconte, Toulouse (FR); Cristina Simache, Toulouse (FR); Michael Paulitsch, Ottobrunn (DE); Kevin Mueller, Munich (DE)

(73) Assignees: AIRBUS OPERATIONS SAS, Toulouse (FR); AIRBUS DEFENCE AND SPACE GMBH, Ottoburn (DE)

( * ) Notice: Subject to any disclaimer, the term of this patent is extended or adjusted under 35 U.S.C. 154(b) by 356 days.

(21) Appl. No.: 14/638,365

(22) Filed: Mar. 4, 2015

(65) Prior Publication Data
US 2015/0254461 A1    Sep. 10, 2015

(30) Foreign Application Priority Data
Mar. 7, 2014    (EP) .................................. 14158360

(51) Int. Cl.
*H04L 5/00*    (2006.01)
*G06F 21/57*    (2013.01)
(Continued)

(52) U.S. Cl.
CPC ............ *G06F 21/577* (2013.01); *G06F 9/455* (2013.01); *G06F 11/364* (2013.01);
(Continued)

(58) Field of Classification Search
CPC ............... G06F 11/364; G06F 11/3668; G06F 11/3688; G06F 21/577; G06F 2221/033; G06F 9/455; H04L 63/14
(Continued)

(56) References Cited

U.S. PATENT DOCUMENTS 6,823,460 B1    11/2004  Hollander et al.
2005/0253572 A1*   11/2005  Chin .................... H03L 7/0814
                                                                324/76.54
(Continued)

OTHER PUBLICATIONS

European Search Report, May 21, 2014.
"Fault injection techniques and tools", Mei-Chen Hsueh et al., Apr. 1, 1997.

*Primary Examiner* — Joseph P Hirl
*Assistant Examiner* — Sayed Beheshti Shirazi
(74) *Attorney, Agent, or Firm* — Greer, Burns & Crain, Ltd.

(57) ABSTRACT

A virtualization platform that provides a systematic, transparent and local testing of components hosted by the virtualization platform in their integrated context. The virtualization platform comprises integrated interceptor modules connected to the components via communication channels, each interceptor module being interposed in the communication channel connecting two components, and an integrated analyzing device connected to the interceptor modules and comprising a control device and a testing device. The control device is configured to put each interceptor module in an operational mode selected out of a set of predetermined operational modes including a testing mode. The testing device is configured to locally test the components connected to the interceptor modules being put in the testing mode.

13 Claims, 4 Drawing Sheets

(51) Int. Cl.
  *G06F 11/36*   (2006.01)
  *G06F 9/455*   (2006.01)
  *H04L 29/06*   (2006.01)

(52) U.S. Cl.
  CPC ...... *G06F 11/3668* (2013.01); *G06F 11/3688* (2013.01); *H04L 63/14* (2013.01); *G06F 2221/033* (2013.01)

(58) Field of Classification Search
  USPC .......................................... 713/166; 726/29
  See application file for complete search history.

(56) References Cited

U.S. PATENT DOCUMENTS

| | | |
|---|---|---|
| 2006/0129880 A1 | 6/2006 | Arcese et al. |
| 2008/0192929 A1* | 8/2008 | Knechtel ............... G06F 21/602 380/44 |
| 2013/0347131 A1* | 12/2013 | Mooring ............. G06F 9/45558 726/29 |
| 2014/0215241 A1* | 7/2014 | Yoon ....................... G06F 1/324 713/322 |

* cited by examiner

TESTING INTEGRATED INDEPENDENT LEVELS OF SECURITY COMPONENTS HOSTED ON A VIRTUALIZATION PLATFORM

CROSS-REFERENCES TO RELATED APPLICATIONS

This application claims the benefit of the European patent application No. 14158360.9 filed on Mar. 7, 2014, the entire disclosures of which are incorporated herein by way of reference.

BACKGROUND OF THE INVENTION

The present invention generally concerns testing integrated independent levels of security components hosted on a virtualization platform and particularly in embedded infrastructures.

In most industrial fields, it is usual to have different systems with different applications communicating with each other in order to achieve an assignment. Each application may be considered as a set of functions and each function is a piece of software contributing to execute a part of the task to be accomplished by the application. For example, many different types of equipment in a vehicle or an aircraft need to exchange data with each other through a communication system in order to accomplish the maneuvering of the vehicle or the aircraft.

Due to the current growing efficiency of computing resources, the trend comprises putting several applications or functions on the same computer platform in order to use the full computing power and memory storage capabilities offered by that platform. This enables avoiding wasting unused resources and thus reduces the production costs as well as the overall weight of the system, which is particularly advantageous in embedded infrastructures for an aircraft, a satellite or a vehicle. This architecture has however the disadvantage of facilitating the propagation of errors. Thus, security means are provided to prevent any design or implementation error on one part of the system from impacting other parts of the system. The system needs also to be protected against deliberate malicious attacks coming from within the system.

This difficulty can be solved by existing security architectures such as MILS (Multiple Independent Levels of Security) built upon strict segregation properties for the execution environments and strict communication paths.

In particular, the functions in a computer system are implemented out of a composition of various more or less loosely coupled sub-functions. For designing a MILS computer system, this approach of loosely-coupled components is valuable. Indeed, splitting a complex system into small components allows defining requirements for these components and enforcing their correct and secure implementation locally. For achieving the complex function again, the components are put together on a same hardware platform. Usually a special operating system (for example, a separation kernel), provides isolated runtime environments, called partitions, for the components. The separation kernel realizes a non-interference property between the different components of the platform. For still allowing communication between partitions, the separation kernel also provides specific channels for an inter-partition communication. The communication channels are controlled and the information flow flowing through them is enforced by a system-wide information flow policy. Both the concept of separation and the concept of controlled information flow between the separated components are the major properties of a MILS system.

FIG. 8 schematically illustrates an example of a MILS system 101 comprising MILS components 103a-103e according to the prior art.

MILS components 103a-103f comprise application partitions 103a-103d, an I/O partition 103e and an external communication interface 103f. The different components operate together via the communication channels 107 of the underlying separation kernel to finally fulfill the system's purpose. The different components communicate via predefined communication paths. There are three different types of communication paths that can be distinguished in a MILS system. These paths comprise an external communication interface, an inter-partition communication interface and communication interface via an I/O partition. The communication between a partition and an external communication interface 103f may be realized via a device driver 109.

Currently, a MILS system is first tested during its development and then by observing its output through external interfaces. In other words, testing of a MILS system currently comprises two kinds of tests. A component or application test in which each application hosted by a partition is tested externally in a stand-alone manner, outside of the context of the MILS system. The second test is an integration test in which the correct behavior of the integrated MILS system is tested by observing the overall system's output to a given input.

However, the known methods do not allow a systematic testing approach. In particular, the prior art methods cannot test the components' reaction while they are already deployed in the MILS system.

Moreover, in certain domains such as in aeronautics, the needs are dictated by particularly severe constraints of reliability and security. In particular, there exist specific requirements that do not allow any system configuration changes between a system under evaluation and the finally deployed in-flight system. Thus, any testing means cannot be removed after the system has been certified.

The purpose of the present invention is therefore to propose a method and a system for locally testing components in their integrated context on a partitioned type platform (for example MILS) and particularly adapted to be systematically used in an embedded environment like avionics without having the aforementioned shortcomings.

SUMMARY OF THE INVENTION

The present invention is defined by a virtualization platform (for example of MILS type) comprising a plurality of integrated independent levels of security components (hereafter called components) interconnected via communication channels, said virtualization platform further comprising:
  integrated interceptor modules connected to said components via said communication channels, each interceptor module being interposed in the communication channel connecting two components, and
  integrated analyzing means connected to said interceptor modules and comprising control means and testing means, said control means being configured to put each interceptor module in an operational mode selected out of a set of predetermined operational modes including a testing mode, and said testing means being configured to locally test the components connected to the interceptor modules being put in the testing mode.

Thus the virtualization platform according to the present invention provides a systematic and transparent testing of the local behavior and reaction of some or all components in their integrated context i.e., while they are deployed in the virtualization platform and without any interference.

The present invention concerns also an embedded infrastructure (for example, a computer) comprising said virtualization platform according to the above characteristics.

In addition, the invention concerns an aircraft communication system comprising an avionic network and an embedded infrastructure according to the above characteristics, the components, interceptor modules, and analyzing means being interconnected via said avionic network.

Moreover, the invention concerns a method for testing integrated independent levels of security components on a virtualization platform, said components being interconnected via communication channels, said method comprising the following steps:
  interposing interceptor modules in the communication channels connecting different components,
  putting each interceptor module in an operational mode selected out of a set of predetermined operational modes including a testing mode, and
  testing locally the components connected to the interceptor modules being put in the testing mode.

BRIEF DESCRIPTION OF THE DRAWINGS

Other characteristics and advantages of the invention will become apparent on reading preferred embodiments of the invention given with reference to the appended figures among which.

DETAILED DESCRIPTION OF THE PREFERRED EMBODIMENTS

The concept of the invention comprises integrating transparent interception means in the communication channels of a MILS type platform enabling to locally test the components of the platform.

Figure 1:
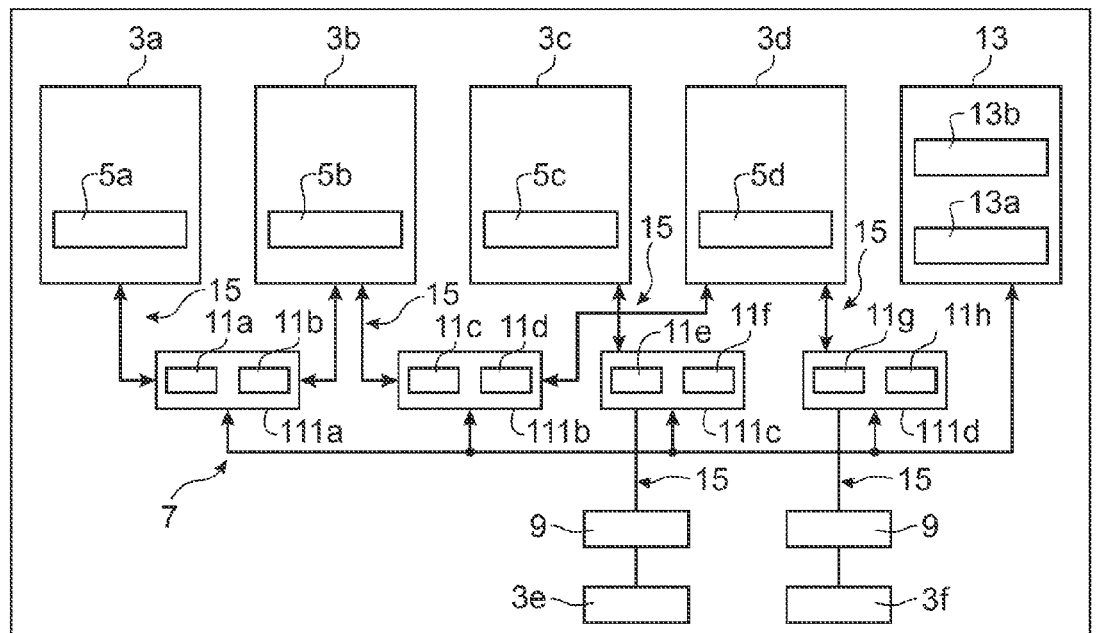
FIG. 1 schematically illustrates a virtualization platform comprising integrated independent levels of security components according to an embodiment of the invention.

FIG. 1 schematically illustrates a virtualization platform 1 comprising integrated independent levels of security components according to an embodiment of the invention.

The integrated independent levels of security components $3a$-$3f$ (hereafter called components) comprise application partitions $3a$-$3c$, input-output partitions $3d$, and external communication interfaces $3e$, $3f$. This example depicts three application partitions $3a$-$3c$, one input-output partition $3d$, and two external communication interfaces $3e$, $3f$ but of course the number is not limited and depends on the desired application.

Each component has a well specified function and is adapted to communicate with other predefined components. For example, each one of components $3a$-$3d$ has a well-defined interface $5a$-$5d$ for communicating with other well identified components to which it is authorized to do so via communication channels 15.

Indeed, the different components $3a$-$3f$ operate together via the communication channels 15 of the underlying platform 1. They communicate via predefined communication paths comprising external communication interfaces, inter-partition communication interfaces and communication interface via an input-output I/O partition. An instantiation of the virtualization platform normally uses a combination of these different communication paths. On the other hand, the communication between a component $3a$-$3d$ and an external communication interface $3e$ may be realized via a device driver 9.

All elements ($3a$-$3f$ and 9) are hosted by a virtualization platform. It is recalled that a virtualization platform of MILS type, developed for high assurance needs, is based essentially on strict segregation and non-interference properties between the different functions. Indeed, a virtualization platform 1 offers the possibility to create isolated runtime environments (i.e., partitions) for each function. It also offers strong temporal and spatial segregation between the partitions (i.e. non-interference properties between hardware and software resources shared by the different functions). Moreover, it provides secure communication means between different partitions hosted by the platform as well as secure communication means (for example, network interfaces) between one or more partitions of the platform and outside domains.

A virtualization platform 1 can be built by using software and/or hardware virtualization techniques such as a MILS Separation Kernel or any other virtualization Operating System fulfilling the above properties. The hardware part of the platform comprises as usual communicating buses (not shown) interconnecting one or more processing units (not shown), storage devices (not shown), and one or more (sometimes virtualized) network interfaces (not shown) as well as a specific hardware module (not shown) for managing direct memory access such as an IOMMU (Input Output Management Memory Unit).

According to the invention, the virtualization platform 1 comprises integrated interceptor modules $11a$-$11h$ (or shims) and an integrated analyzing device or means 13.

The architecture of FIG. 1 shows a set of integrated interceptor modules $11a$-$11h$ connected to different components $3a$-$3f$ of the platform 1 via the communication channels 15. Each interceptor module $11a$-$11h$ is interposed in a communication channel 15 connecting two components. The example of FIG. 1 shows that the interceptor modules are paired up into different couples $111a$-$111d$ allowing bidirectional communication between the different components.

The integrated analyzing means 13 is connected to the interceptor modules $11a$-$11h$ via a control and communication channel 7. It coordinates between the interceptor modules 11a-11h and the components 3a-3f and it orchestrates the stimulus and test evaluation of each component.

In particular, the analyzing means 13 comprises control device or means 13a and testing device or means 13b. The control means 13a are configured to put each interceptor module 11a-11h in an operational mode selected out of a set of predetermined operational modes including a testing mode. The testing means 13b are configured to locally test the component or components 3a-3d connected to the interceptor modules 11a-11h being put in the testing mode.

According to one embodiment, each interceptor module is configured to run isolated in its own resource partition. As a variant, an interceptor module may also be combined with the integrated analyzing means 13 or with other partitions.

Advantageously, the set of predetermined operational modes comprises three modes: testing mode, transmitting mode and observation mode. Thus, any interceptor module 11a-11h can be put in either one of these three modes. The testing mode enables to test the behavior and reaction of components 3a-3d by re-routing the communication traffic towards the testing means 13b and modifying this traffic according to testing procedures. In a transmitting mode, the interceptor module 11a-11h forwards all traffic to the intended destination component enabling the components to operate in a normal way. Finally, the observation mode enables only to passively listen to the communication between two components 3a-3f without any modification of the normal traffic.

Figure 2:
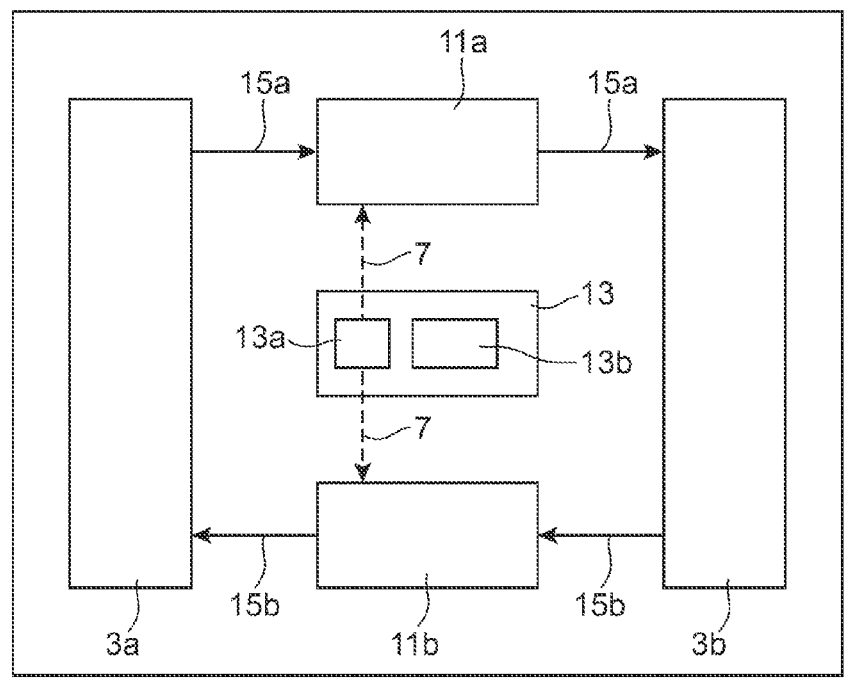
FIG. 2 schematically illustrates a communication interface between two components of the virtualization platform demonstrating a method for testing the components according to an embodiment of the invention.

FIG. 2 schematically illustrates a communication interface between two components of the virtualization platform demonstrating a method for testing the components according to an embodiment of the invention.

For simplicity reasons, this example only shows a first component 3a and a second component 3b hosted by a virtualization platform 1 and connected to each other via communication channels 15. Each component may be an application partition, an input-output partition, or an external communication interface connected to a driver device 9 (see FIG. 1).

The method comprises incorporating interception and analyzing logic into the virtualization platform in order to intercept traffic and analyze the different components' behavior.

In particular, a couple of first and second interceptor modules 11a, 11b are interposed in the communication channels 15 connecting the two components 3a, 3b. Interceptor module 11a is integrated in a first communication channel 15a connecting the sender 3a and receiver 3b components, while interceptor module 11b is integrated in a second communication channel 15b connecting the sender 3b and the receiver 3a components.

Moreover, an analyzing means 13 comprising a controlling means 13a and a testing means 13b is integrated in the platform 1 and is connected to the first and second interceptor modules 11a, 11b via the communication channels 7.

Each interceptor module is controlled by the controlling means 13a and is put in an operational mode selected out of a set of predetermined operational modes comprising a testing mode, a transmitting mode and an observation mode.

At least one component is locally tested by the testing means 13b when the interceptor modules 11a, 11b are put in the testing mode. The testing steps comprise blocking data destined to the component under test, introducing testing packets into that component, and testing its reaction by collecting and analyzing its output result (see FIG. 5).

Advantageously, the implementation of each interceptor module is made small, fast and responsive by using small sequences of code instructions.

Figure 3:
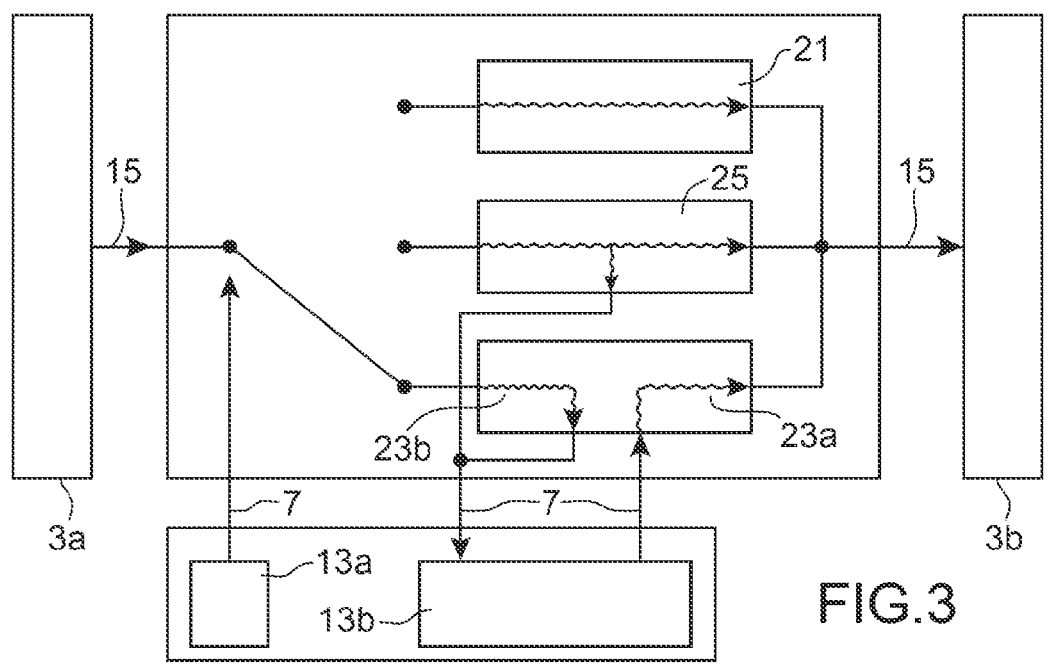
FIG. 3 schematically illustrates an interceptor module implemented by a set of threads according to one embodiment of the invention.

Indeed, FIG. 3 schematically illustrates an interceptor module implemented by a set of threads according to one embodiment of the invention.

According to this embodiment, each interceptor module 3 is implemented by multiple threads comprising a transmitting thread 21, first and second testing threads 23a, 23b, and an observing thread 25.

The transmitting thread 21 is adapted to transmit data from a sender component 3a to a receiver component 3b. The first testing thread 23a is adapted to transmit data from the analyzing means 13 into a receiver component 3b. The second testing thread 23b is adapted to transmit data from a sender component into the analyzing means 13. Finally, the observing thread 25 is adapted to send data from a sender component 3a into a receiver component 3b as well as into the analyzing means 13b.

For each interceptor module 11 the control means 13a is configured to switch between the different threads 21-25 in order to put the interceptor module 11 in a transmitting mode by activating the transmitting thread 21, or a testing mode by activating at least one testing thread 23a, 23b, or an observation mode by activating the observing thread 25.

For example, in an avionic environment, the different components 3a-3f, interceptor modules 11a-11h and analyzing means 13 can be connected by ARINC-653 queuing ports. The queuing ports are implemented by the operating system in a way that data transmitted to a channel by one partition flows non-interfered to the destination partition according to a FIFO queuing operation.

Figure 4:
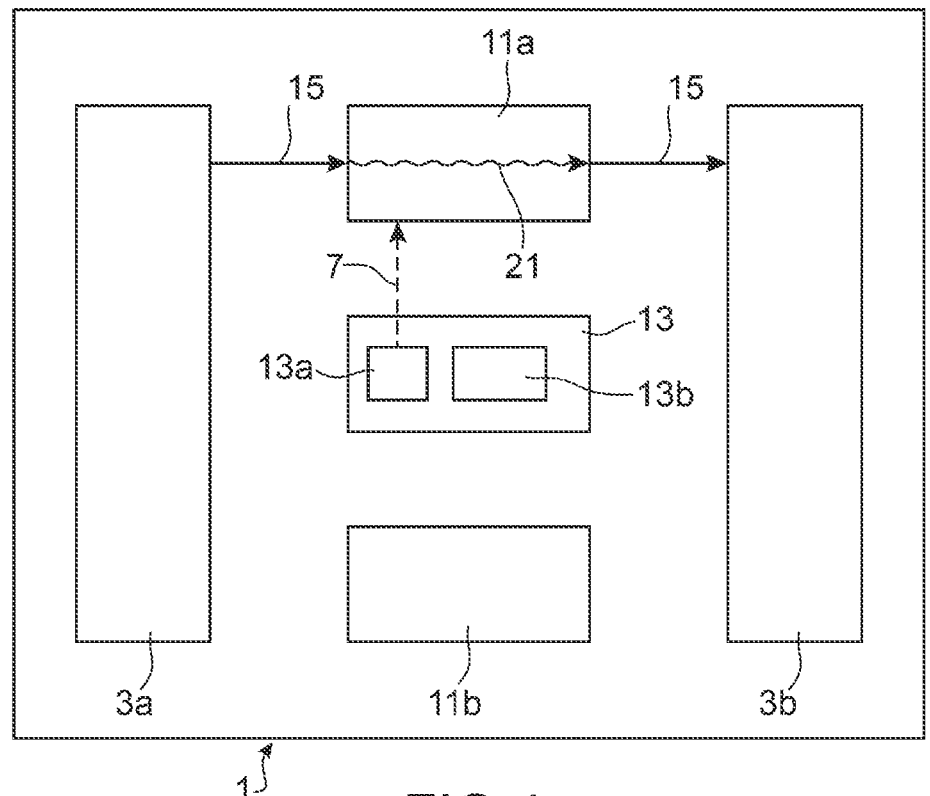
FIG. 4 schematically illustrates the interceptor modules in a transmitting mode according to the embodiment of FIG. 2.

FIG. 4 schematically illustrates the interceptor modules in a transmitting mode according to the embodiment of FIG. 2.

In the transmitting or normal mode, the transmitting thread 21 is configured to perform a blocked read on the destination port of the queuing channel connected to the sender's component 3a. It is thus adapted to stay in a sleep state as long as no data is available (i.e., as long as no data is sent to the queuing channel). As soon as data becomes available, the transmitting thread 21 becomes activated and is then adapted to read the data from the queuing port (sent by the sender component 3a) and to transmit it to the source port of the channel connected to the destination component 3b.

Figure 5:
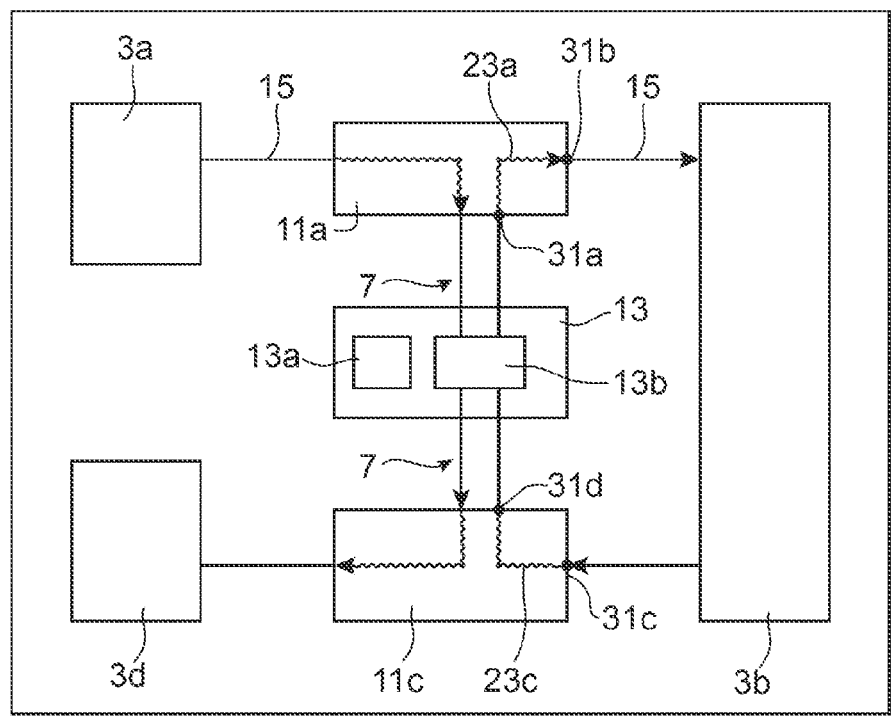
FIG. 5 schematically illustrates the interceptor modules in a testing mode according to the embodiment of FIG. 2.

FIG. 5 schematically illustrates the interceptor modules in a testing mode according to the embodiment of FIG. 2. This example shows the testing of component 3b in relation with components 3a and 3d of FIG. 1.

In the testing mode, a first testing thread 23a of a first interceptor module 11a connected to a component 3b under test is adapted to perform a blocked read on the destination port 31a connected to the testing means 13b. This channel is used to introduce testing packets from the testing means 13b into the component 3b under test. The thread 23a sleeps as long as no data has been sent to the queuing channel. When the testing packets become available, the first testing thread 23a becomes active, reads the testing packets from the queuing port 31a and transfers them to the source port 31b connected to the component 3b under test.

A second testing thread 23c of a second interceptor module 11c connected to the component 3b under test is adapted to transmit an output result from said component 3b under test into the testing means 13b. This second testing thread 23c is adapted to perform a blocked read on the destination port 31c of the queuing channel connected to the sender component 3b. Since this second testing thread 23c also performs a blocked read, it sleeps until data becomes available in the channel. Once it becomes available, the second testing thread 23c transmits this data to the source port 31d connected to the testing means 13b which is configured to test the reaction of the component 3b under test by analyzing the output result.

More generally, in the case where the component under test 3b has several inputs and outputs, possibly coming from or going to multiple components, the testing means 13b is configured to orchestrate the control of all interceptor modules implicated on the input and output communication channels in order to conduct different testing scenarios. For example, in reference to FIG. 1, components 3a and 3d may send data to component 3b, via interceptor modules 11a and 11d respectively. The output of the component 3b can be observed via interceptor module 11c for the case where the output data are transmitted to component 3d or via the interceptor module 11b for the case where the output data are transmitted to component 3a.

Figure 6:
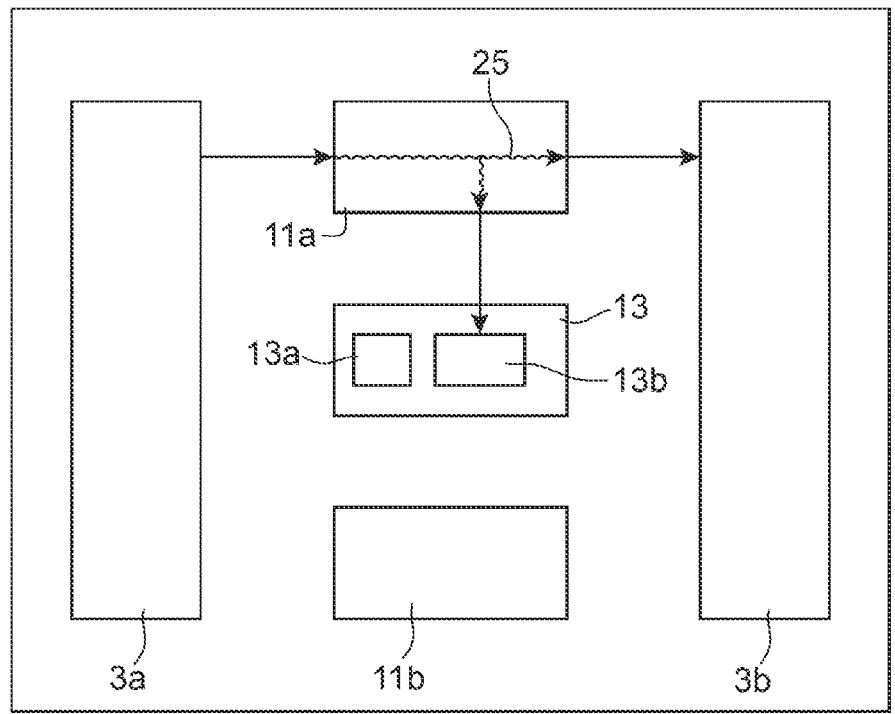
FIG. 6 schematically illustrates the interceptor modules in an observation mode according to the embodiment of FIG. 2.

FIG. 6 schematically illustrates the interceptor modules in an observation mode according to the embodiment of FIG. 2.

In the observation mode, the observing thread 25 of an interceptor module 11a is adapted to stay in a sleep state as long as no data is available and to transmit data from the sender component 3a into the receiver component 3b as well as to the testing means 13b when data becomes available. The testing means 13b is configured to observe the data flow between the sender 3a and receiver 3b components.

According to another embodiment, the interceptor module's functionality is realized by re-implementing the queuing ports. The control means 13a are configured to reroute a traffic flow by specific flags in order to put an interceptor module 11a-11h in a transmitting mode, or an observation mode, or a testing mode. The flag enables the interceptor module to re-route the traffic originally sent to another component towards the testing means 13b. This embodiment reduces the overhead configuration and the number of partitions. However, some critical parts of the operating system need to be re-implemented.

In other respects, it is to be noted that the control means 13a are configured to put all interceptor modules 11a-11h in the same operational mode or to put different interceptor modules in different operational modes.

Figure 7:
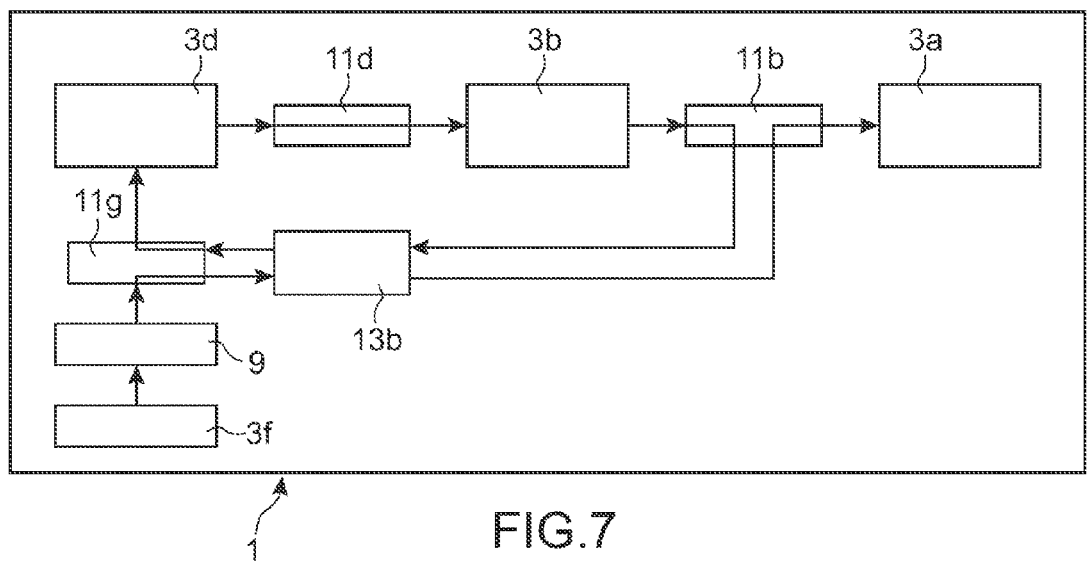
FIG. 7 schematically illustrates a chain of components under test according to an embodiment of the present invention.
Figure 8:
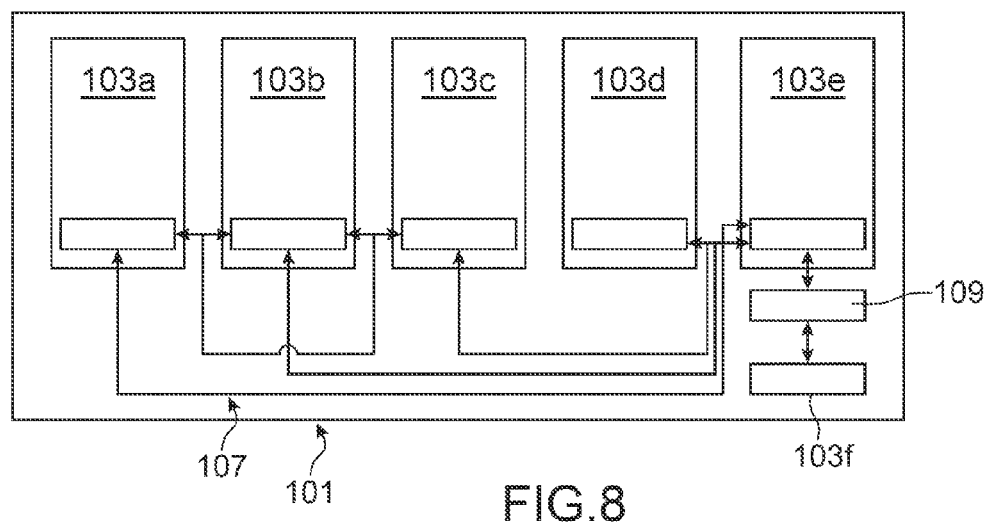
FIG. 8 schematically illustrates an example of a MILS system comprising MILS components according to the prior art.

Indeed, FIG. 7 schematically illustrates a chain of components under test according to an embodiment of the present invention.

This example shows that two interceptor modules 11b, 11g are in the test mode while a third interceptor module 11d in the transmitting mode. Indeed, the interceptor modules are adapted to intercept the communication between multiple components 3a-3f in the platform 1 and thus, it is possible to operate some interceptor modules in a transmitting mode, some others in a testing mode and still some others in an observation mode. This configuration allows testing the correct integration of a subset of the components by creating chains of components under test.

Advantageously, the different queuing ports and interceptor modules are implemented in software. However, it is also possible to transfer some parts of these elements into hardware. For example, the QMan of the P4080 Data Path Acceleration Architecture (DPAA) is adapted to be operated as hardware FIFOs. The destination of such a FIFO queue is provided by an ID in the software queuing command to the hardware element. Thus, the QMan may be used to implement the functionality of the Queuing Port. Changing the destination IDs in the queue command enables to implement the intercepting module's functionality by routing the data packets in the hardware FIFO to the analyzing means.

The virtualization platform according to the present invention is advantageously used in an embedded infrastructure. In particular, it is adapted to be used in an aircraft communication system in which the different components, intercepting modules and analyzing means are connected by queuing ports of an avionic network of for example ARINC-653 or avionix full-duplex switched ethernet type.

The virtualization platform according to the present invention provides a transparent testing technology allowing testing the components locally in their integrated system context. This approach fulfils the avionic requirements and can be easily deactivated for in-flight operations by putting all the interceptor modules in a transmitting mode. Also it provides systematic means to set clearly test points without interfering or perturbing the applications running on the different components.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A virtualization platform comprising:
a plurality of integrated independent levels of security components, interconnected via communication channels,
integrated interceptor modules connected to said security components via said communication channels, wherein each integrated interceptor module being interposed in the communication channel connecting two components, wherein each integrated interceptor module is implemented by multiple threads comprising a first testing thread adapted to transmit data from an integrated analyzing device to a receiver component, and a second testing thread adapted to transmit data from a sender component into said analyzing device; and
the integrated analyzing device connected to said integrated interceptor modules and comprising a control device and a testing device,
said control device being configured to put each interceptor module in an operational mode selected out of a set of predetermined operational modes including a testing mode, and
said testing device being configured to locally test the components connected to the interceptor modules being put in the testing mode, wherein in a testing mode a first testing thread of a first integrated interceptor module connected to a component under test is adapted to perform a blocked read on a destination port connected to the testing device and to introduce testing packets from the testing device into the component under test, and in that a second testing thread of a second integrated interceptor module connected to the component under test is adapted to transmit an output result from the component under test into the testing device, and perform a blocked read on the destination of a queuing channel connected to the sender component, said testing device being configured to test the reaction of the component under test by analyzing said output result;

wherein the integrated interceptor module, the integrated analyzing device, control device, testing device, the first testing thread, the second testing thread, the sender component, and the receiver component are implemented using one or more hardware processing unit.

2. The virtualization platform according to claim 1, wherein said set of predetermined operational modes further comprises a transmitting mode and an observation mode.

3. The virtualization platform according to claim 1, wherein said control device is configured to put all interceptor modules in the same operational mode or to put different interceptor modules in different operational modes.

4. The virtualization platform according to claim 1, wherein the multiple threads of each integrated interceptor module further comprises a transmitting thread adapted to transmit data from the sender component to the receiver component, and an observing thread adapted to send data from the sender component to the receiver component as well as into said analyzing device and such that, for each integrated interceptor module said control device is configured to switch between the different threads in order to put the interceptor module in a transmitting mode by activating the transmitting thread, or a testing mode by activating at least one testing thread, or an observation mode by activating the observing thread;

wherein the transmitting thread and the observing thread are implemented using one or more hardware processing units.

5. The virtualization platform according to claim 4, wherein in a transmitting mode said transmitting thread is adapted to stay in a sleep state as long as no data is available and to transmit data from the sender component into the receiver component when data becomes available.

6. The virtualization platform according to claim 4, wherein in an observation mode said observing thread is adapted to stay in a sleep state as long as no data is available and to transmit data from the sender component into the receiver component as well as to the testing means when data becomes available, said testing means being configured to observe the data flow between the sender and receiver components.

7. The virtualization platform according to claim 1, wherein each integrated interceptor module comprises queuing ports and said control device is configured to reroute a traffic flow by specific flags in order to put an interceptor module in one of a transmitting mode, an observation mode, and a testing mode.

8. The virtualization platform according to claim 1, wherein said set of components comprises application partitions, input-output partitions, driver devices and external communication interfaces.

9. The virtualization platform according to claim 1, wherein said virtualization platform is a MILS platform.

10. An embedded infrastructure comprising said virtualization platform according to claim 1.

11. An aircraft communication system comprising an avionic network and an embedded infrastructure according to claim 10, wherein said components, integrated interceptor modules, and analyzing device are interconnected via said avionic network.

12. A method for testing integrated independent levels of security components, on a virtualization platform, said components being interconnected via communication channels, wherein said method comprises the following steps:

interposing interceptor modules in the communication channels connecting different components, wherein each interposed interceptor module is implemented by multiple threads comprising a first testing thread adapted to transmit data from an integrated analyzing device to a receiver component, and a second testing thread adapted to transmit data from a sender component into said analyzing device, wherein the integrated analyzing device comprises a control device and a testing device;

putting, by a control device, each interceptor module in an operational mode selected out of a set of predetermined operational modes including a testing mode, and locally testing the components connected to the interceptor modules being put in the testing mode, wherein in a testing mode a first testing thread of a first interposed interceptor module connected to a component under test is adapted to perform a blocked read on a destination port connected to the testing device and to introduce the testing packets from the testing device into the component under test, and in that a second testing thread of a second interposed interceptor module connected to the component under test is adapted to transmit an output result from said component under test into the testing device, and perform a blocked read on the destination of a queuing channel connected to the sender component, said testing device being configured to test the reaction of the component under test by analyzing said output result;

wherein the interposed interceptor modules, the integrated analyzing device, control device, a testing device, the first testing thread, the second testing thread, the sender component, and the receiver component are implemented using one or more hardware processing units.

13. The method according to claim 12, wherein the multiple threads of each interposed interceptor module further comprise a transmitting thread adapted to transmit data from the sender component to the receiver component, and an observing thread adapted to send data from the sender component to the receiver component as well as into said analyzing device and such that, for each interposed interceptor module said control device is configured to switch between the different threads in order to put the interceptor module in a transmitting mode by activating the transmitting thread, or a testing mode by activating at least one testing thread, or an observation mode by activating the observing thread;

wherein the transmitting thread and the observing thread are implemented using the one or more hardware processing units.

* * * * *